United States Patent
Mi et al.

(10) Patent No.: US 11,838,864 B2
(45) Date of Patent: Dec. 5, 2023

(54) METHOD FOR DETECTING WAKE-UP SIGNAL AND TERMINAL DEVICE

(71) Applicant: HUAWEI TECHNOLOGIES CO., LTD., Guangdong (CN)

(72) Inventors: Xiang Mi, Beijing (CN); Xiaolei Tie, Shanghai (CN); Zhe Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 479 days.

(21) Appl. No.: 17/172,285

(22) Filed: Feb. 10, 2021

(65) Prior Publication Data
US 2021/0168716 A1 Jun. 3, 2021

Related U.S. Application Data

(63) Continuation of application No. PCT/CN2018/100104, filed on Aug. 10, 2018.

(51) Int. Cl.
*G08C 17/00* (2006.01)
*H04W 52/02* (2009.01)
(Continued)

(52) U.S. Cl.
CPC ....... *H04W 52/0225* (2013.01); *H04W 68/02* (2013.01); *H04W 76/28* (2018.02)

(58) Field of Classification Search
CPC .. H04W 52/0225; H04W 76/28; H04W 68/02
See application file for complete search history.

(56) References Cited

U.S. PATENT DOCUMENTS

| 2004/0043798 A1 | 3/2004 | Amerga et al. |
| 2009/0209273 A1 | 8/2009 | Ha et al. |
| 2018/0176883 A1* | 6/2018 | Fujishiro ........... H04W 52/0206 |

FOREIGN PATENT DOCUMENTS

| CN | 101500181 A | 8/2009 |
| CN | 101784009 A | 7/2010 |

(Continued)

OTHER PUBLICATIONS

3GPP TS 24.301 V15.3.0 (Jun. 2018), "3rd Generation Partnership Project; Technical Specification Group Core Network and Terminals; Non-Access-Stratum (NAS) protocol for Evolved Packet System (EPS); Stage 3 (Release 15)," Jun. 2018, 528 pages.
(Continued)

*Primary Examiner* — Erika A Washington
(74) *Attorney, Agent, or Firm* — Fish & Richardson P.C.

(57) ABSTRACT

The present disclosure relates to methods and terminal devices for detecting a wake-up signal. A terminal device sends first information to a network device, where the first information indicates a reported gap, receives second information sent by the network device, and determines a configuration condition of a first gap and a configuration condition of a second gap based on the second information. The terminal device determines a target gap based on the reported gap, the configuration condition of the first gap, and the configuration condition of the second gap, and detects a wake-up signal at a detection position before a start position of the first paging opportunity in a paging time window, where the detection position is determined based on the target gap and maximum duration of the wake-up signal.

8 Claims, 7 Drawing Sheets

(51) Int. Cl.
*H04W 76/28* (2018.01)
*H04W 68/02* (2009.01)

(56) References Cited

FOREIGN PATENT DOCUMENTS

| | | |
|---|---|---|
| CN | 104540214 A | 4/2015 |
| CN | 106961471 A | 7/2017 |
| CN | 107770851 A | 3/2018 |
| CN | 107770852 A | 3/2018 |
| CN | 108353303 A | 7/2018 |
| CN | 111432460 A | 7/2020 |
| EP | 3322238 A1 | 5/2018 |
| RU | 2662451 C1 | 7/2018 |
| WO | 2017171454 A1 | 10/2017 |

OTHER PUBLICATIONS

3GPP TS 36.211 V15.2.0 (Jun. 2018), "3rd Generation Partnership Project; Technical Specification Group Radio Access Network; Evolved Universal Terrestrial Radio Access (E-UTRA); Physical channels and modulation (Release 15)," Jun. 2018, 236 pages.
3GPP TS 36.213 V15.2.0 (Jun. 2018), "3rd Generation Partnership Project; Technical Specification Group Radio Access Network; Evolved Universal Terrestrial Radio Access (E-UTRA); Physical layer procedures (Release 15)," Jun. 2018, 541 pages.
3GPP TS 36.304 V15.0.0 (Jun. 2018), "3rd Generation Partnership Project; Technical Specification Group Radio Access Network; Evolved Universal Terrestrial Radio Access (E-UTRA); User Equipment (UE) procedures in idle mode Release 15)," Jun. 2018, 52 pages.
3GPP TS 36.306 V15.1.0 (Jul. 2018), "3rd Generation Partnership Project; Technical Specification Group Radio Access Network; Evolved Universal Terrestrial Radio Access (E-UTRA); User Equipment (UE) radio access capabilities (Release 15)," Jul. 2018, 98 pages.
3GPP TS 36.331 V15.2.2 (Jun. 2018), "3rd Generation Partnership Project; Technical Specification Group Radio Access Network; Evolved Universal Terrestrial Radio Access (E-UTRA); Radio Resource Control (RRC); Protocol specification (Release 15)," Jun. 2018, 791 pages.
PCT International Search Report and Written Opinion in International Application No. PCT/CN2018/100104, dated May 9, 2019, 16 pages.
Huawei, HiSilicon, "Feature lead summary of Wake-up signal configurations and procedures in NB-Iot," 3GPP TSG RAN WG1 Meeting #92bis, R1-1805289, Sanya, China, Apr. 16-20, 2018, 11 pages.
Office Action issued in Chinese Application No. 201880096361.7 dated Aug. 3, 2021, 5 pages.
Qualcomm Incorporated, "Remaining issues on WUS configurations and procedures," 3GPP TSG RAN WG1 Meeting #93, R1-1807108, Busan, Korea, May 21-25, 2018, 9 pages.
Huawei, HiSilicon, "Corrections for RIL H652, H655m H656 and H657 on WUS," 3GPP TSG RAN WG2 #103, R2-1812193, Gothenburg, Sweden, Aug. 20-24, 2018, 5 pages.
Office Action issued in Japanese Application No. 2021-507066 dated Mar. 15, 2022, 6 pages (with English translation).
Office Action issued in Chinese Application No. 201880096361.7 dated Feb. 18, 2022, 6 pages (with English translation).
Office Action issued in Russian Application No. 2021105659107(012333) dated Nov. 25, 2021, 16 pages (with nglish translation).
Extended European Search Report issued in European Application No. 18929787.2 dated Jul. 20, 2021, 11 pages.
Huawei et al., "Updated feature lead summary of Wake-up signal configurations and procedures in NB-Iot," 3GPP TSG RAN WGI Meeting #93, R1-1807560, Busan, Korea, May 21-25, 2018, 19 pages.
MediaTek Inc., "Miscellaneous Issues of NB-IOT Wake Up Signal," 3GPP TSG-RAN WG2 Meeting #101 bis, R2-1805101, Sanya, China, Apr. 16-20, 2018, 5 pages.
Qualcomm, "Remaining issues of 6.2.6.3 Wake-up signal," 3GPP TSG RAN WG1 Meeting #93, R1-1807528, Busan, Korea, May 21-25, 2018, 12 pages.

\* cited by examiner

METHOD FOR DETECTING WAKE-UP SIGNAL AND TERMINAL DEVICE

CROSS-REFERENCE TO RELATED APPLICATIONS

This application is a continuation of International Application No. PCT/CN2018/100104, filed on Aug. 10, 2018, the disclosure of which is hereby incorporated by reference in its entirety.

TECHNICAL FIELD

This application relates to the communications field, and more specifically, to a method for detecting a wake-up signal and a terminal device in a communications system.

BACKGROUND

An Internet of Things (internet of things, IoT) is a machine type communication (machine type communication, MTC)-oriented network, and is a type of important networks in the future communications field. IoT communication is mainly applied to intelligent meter reading, medical detection and monitoring, logistics detection, industrial detection and monitoring, Internet of Vehicles, intelligent community, wearable device communication, and the like. There are various IoT application scenarios, from outdoor to indoor and from overground to underground. Therefore, many special requirements on IoT design come up.

Enhanced coverage: Many IoT terminals are located in areas with poor coverage. For example, electric meters and water meters are often located in areas with poor wireless network signals, such as indoor areas or basements. Therefore, a coverage enhancement technology is needed to improve communication quality in areas that are under poor signal coverage.

Large quantity of terminals: A quantity of IoT devices is far greater than a quantity of people-to-people communication devices.

Low service rate and insensitivity to latency: Data packets transmitted by IoT devices are usually small and insensitive to latency.

Extremely low cost: Many IoT applications require very low costs for terminal devices to facilitate large-scale deployment.

Low power consumption: In most cases, IoT devices are powered by batteries and can be used for more than 10 years without battery replacement. This requires that IoT devices work with extremely low power consumption.

To meet these special requirements, the mobile communication standards organization 3rd Generation Partnership Project (3rd generation partnership project, 3GPP) agreed on a new research topic at the 62nd meeting of the Global System for Mobile Communications (global system for mobile communications, GSM)/enhanced data rates for GSM evolution (enhanced data rates for GSM evolution, EDGE) radio access network (GSM/EDGE radio access network, GERAN), to study a method for supporting an extremely low-complexity and low-cost IoT in a cellular network, and initiated a topic of a narrowband Internet of Things (narrow band internet of things. NB-IoT) at the 69th meeting of the radio access network (radio access network, RAN).

In a wireless communications system, a terminal device has two modes. One is a connected mode, indicating that the terminal device has established a connection to a network device and can directly communicate with the network device. The other is an idle mode, or referred to as a sleep mode, indicating that the terminal device cannot directly communicate with a network device. A terminal device in idle mode periodically wakes up to monitor a paging message, to check whether there is a paging indication for the terminal device. A position at which the terminal device wakes up is referred to as a paging occasion (paging occasion, PO). The terminal device monitors a narrowband physical downlink control channel (narrow band physical downlink control channel, NPDCCH) at the PO. However, in actual application, a probability that a network device pages the terminal device and a probability that a system message changes are usually very low, and there may be no paging at most POs. In other words, the network device does not send a corresponding NPDCCH at a PO, but the terminal device still needs to monitor an NPDCCH at each PO. This is because the terminal device knows whether the network device sends an NPDCCH only after blind detection is completed, which is actually a waste of power consumption.

To resolve the foregoing problem, a wake-up signal (wake-up signal, WUS) is introduced in NB-IoT R15, to indicate whether a terminal device needs to be woken up at a PO position to receive and detect a subsequent NPDCCH. Specifically, the terminal device detects a wake-up signal before a PO. If the WUS signal is detected, the terminal device detects a subsequent NPDCCH. If no WUS signal is detected, the terminal device does not detect a subsequent NPDCCH.

However, the standard does not specify a position at which a WUS signal appears. In this case, the terminal can learn, only by performing multiple times of blind detection, where the network device sends the WUS signal, or even cannot determine whether the network device sends the WUS signal. This significantly increases power consumption of the terminal device. Therefore, how to reduce power consumption of the terminal device caused by blind detection is an urgent problem to be resolved.

SUMMARY

This application provides a method for detecting a wake-up signal and a terminal device, so that the terminal device can determine a position for detecting a wake-up signal, thereby reducing power consumption of the terminal device.

According to a first aspect, a method for detecting a wake-up signal is provided. The method includes: A terminal device sends first information to a network device, where the first information is used to indicate a reported gap; the terminal device receives second information sent by the network device: the terminal device determines a configuration condition of a first gap and a configuration condition of a second gap based on the second information; the terminal device determines a target gap based on the reported gap, the configuration condition of the first gap, and the configuration condition of the second gap; and the terminal device detects a wake-up signal at a detection position before a start position of the first paging occasion PO in a paging time window PTW, where the detection position is determined based on the target gap and maximum duration of the wake-up signal.

In the foregoing technical solution, the terminal device determines the target gap based on the reported gap, the configuration condition of the first gap, and the configuration condition of the second gap, and further determines the position for detecting the wake-up signal with reference to the maximum duration of the wake-up signal, so that the terminal device can be prevented from blindly detecting the wake-up signal, thereby reducing power consumption of the terminal device.

In a possible implementation, the reported gap is 40 ms, 240 ms, 1 s, or 2 s.

In a possible implementation, the configuration condition of the first gap includes: The first gap is set to 40 ms, the first gap is set to 80 ms, the first gap is set to 160 ms, and the first gap is set to 240 ms. The configuration condition of the second gap includes: The second gap is not configured, the second gap is set to 1 s, and the second gap is set to 2 s.

In a possible implementation, that the terminal device determines a target gap based on the reported gap, the configuration condition of the first gap, and the configuration condition of the second gap includes: When the reported gap is 1 s, the first gap is set to 40 ms, and the second gap is not configured, it is determined that the target gap is 40 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 1 s, the first gap is set to 80 ms, and the second gap is not configured, it is determined that the target gap is 80 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 1 s, the first gap is set to 160 ms, and the second gap is not configured, it is determined that the target gap is 160 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 1 s, the first gap is set to 240 ms, and the second gap is not configured, it is determined that the target gap is 240 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 2 s, the first gap is set to 40 ms, and the second gap is not configured, it is determined that the target gap is 40 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 2 s, the first gap is set to 80 ms, and the second gap is not configured, it is determined that the target gap is 80 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 2 s, the first gap is set to 160 ms, and the second gap is not configured, it is determined that the target gap is 160 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 2 s, the first gap is set to 240 ms, and the second gap is not configured, it is determined that the target gap is 240 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is an eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

In a possible implementation, that the terminal device determines a target gap based on the reported gap, the configuration condition of the first gap, and the configuration condition of the second gap includes: When the reported gap is 1 s, the first gap is set to 40 ms, 80 ms, 160 ms, or 240 ms, and the second gap is not configured, it is determined that the target gap is a third gap, where the third gap is 40 ms, 80 ms, 160 ms, or 240 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is a DRX gap. In this way, the network device does not need to additionally configure a wake-up signal gap in these cases, thereby reducing overheads of the network device.

In a possible implementation, the third gap is configured by the network device for the terminal device.

In a possible implementation, that the terminal device determines a target gap based on the reported gap, the configuration condition of the first gap, and the configuration condition of the second gap includes: When the reported gap is 2 s, the first gap is set to 40 ms, 80 ms, 160 ms, or 240 ms, and the second gap is not configured, it is determined that the target gap is a fourth gap, where the fourth gap is 40 ms, 80 ms, 160 ms, or 240 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is a DRX gap. In this way, the network device does not need to additionally configure a wake-up signal gap in these cases, thereby reducing overheads of the network device.

In a possible implementation, the fourth gap is configured by the network device for the terminal device.

In a possible implementation, that the terminal device determines a target gap based on the reported gap, the configuration condition of the first gap, and the configuration condition of the second gap includes: When the reported gap is 240 ms, and the first gap is set to 40 ms, 80 ms, or 160 ms, it is determined that the target gap is a fifth gap, where the fifth gap is 40 ms, 80 ms, 160 ms, or 240 ms.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 240 ms and the first gap is set to 40 ms, 80 ms, or 160 ms, the target gap is a DRX gap. In this way, the network device does not need a wake-up signal gap that is configured additionally in these cases, thereby reducing overheads of the network device.

In a possible implementation, the fifth gap is configured by the network device for the terminal device.

According to a second aspect, a method for sending a wake-up signal is provided. The method includes: A network device receives first information sent by a terminal device, where the first information is used to indicate a reported gap; the network device sends second information to the terminal device, where the second information is used to indicate a configuration condition of a first gap and a configuration condition of a second gap: the network device determines a target gap based on the reported gap, the configuration condition of the first gap, and the configuration condition of the second gap; and the network device sends a wake-up signal at a detection position before a start position of the first paging occasion in a paging time window PTW, where the detection position is determined based on the target gap and maximum duration of the wake-up signal.

In a possible implementation, the configuration condition of the first gap includes: The first gap is set to 40 ms, the first gap is set to 80 ms, the first gap is set to 160 ms, and the first gap is set to 240 ms. The configuration condition of the second gap includes: The second gap is not configured, the second gap is set to 1 s, and the second gap is set to 2 s.

In a possible implementation, that the network device determines a target gap based on the reported gap, the configuration condition of the first gap, and the configuration condition of the second gap includes: When the reported gap is 1 s, the first gap is set to 40 ms, and the second gap is not configured, it is determined that the target gap is 40 ms.

In a possible implementation, that the network device determines a target gap based on the reported gap, the configuration condition of the first gap, and the configuration condition of the second gap includes: When the reported gap is 1 s, the first gap is set to 80 ms, and the second gap is not configured, it is determined that the target gap is 80 ms.

In a possible implementation, that the network device determines a target gap based on the reported gap, the configuration condition of the first gap, and the configuration condition of the second gap includes: When the reported gap is 1 s, the first gap is set to 160 ms, and the second gap is not configured, it is determined that the target gap is 160 ms.

In a possible implementation, that the network device determines a target gap based on the reported gap, the configuration condition of the first gap, and the configuration condition of the second gap includes: When the reported gap is 1 s, the first gap is set to 240 ms, and the second gap is not configured, it is determined that the target gap is 240 ms.

In a possible implementation, that the network device determines a target gap based on the reported gap, the configuration condition of the first gap, and the configuration condition of the second gap includes: When the reported gap is 2 s, the first gap is set to 40 ms, and the second gap is not configured, it is determined that the target gap is 40 ms.

In a possible implementation, that the network device determines a target gap based on the reported gap, the configuration condition of the first gap, and the configuration condition of the second gap includes: When the reported gap is 2 s, the first gap is set to 80 ms, and the second gap is not configured, it is determined that the target gap is 80 ms.

In a possible implementation, that the network device determines a target gap based on the reported gap, the configuration condition of the first gap, and the configuration condition of the second gap includes: When the reported gap is 2 s, the first gap is set to 160 ms, and the second gap is not configured, it is determined that the target gap is 160 ms.

In a possible implementation, that the network device determines a target gap based on the reported gap, the configuration condition of the first gap, and the configuration condition of the second gap includes: When the reported gap is 2 s, the first gap is set to 240 ms, and the second gap is not configured, it is determined that the target gap is 240 ms.

In a possible implementation, that the network device determines a target gap based on the reported gap, the configuration condition of the first gap, and the configuration condition of the second gap includes: When the reported gap is 1 s, the first gap is set to 40 ms, 80 ms, 160 ms, or 240 ms, and the second gap is not configured, it is determined that the target gap is a third gap, where the third gap is 40 ms, 80 ms, 160 ms, or 240 ms.

In a possible implementation, that the network device determines a target gap based on the reported gap, the configuration condition of the first gap, and the configuration condition of the second gap includes: When the reported gap is 2 s, the first gap is set to 40 ms, 80 ms, 160 ms, or 240 ms, and the second gap is not configured, it is determined that the target gap is a fourth gap, where the fourth gap is 40 ms, 80 ms, 160 ms, or 240 ms.

In a possible implementation, that the network device determines a target gap based on the reported gap, the configuration condition of the first gap, and the configuration condition of the second gap includes: When the reported gap is 240 ms, and the first gap is set to 40 ms, 80 ns, or 160 ms, it is determined that the target gap is a fifth gap, where the fifth gap is 40 ms, 80 ms, 160 ms, or 240 ms.

According to a third aspect, a terminal device is provided, including a module configured to perform the method in any one of the first aspect or the implementations of the first aspect.

According to a fourth aspect, a network device is provided, including a module configured to perform the method in any one of the second aspect or the implementations of the second aspect.

According to a fifth aspect, a terminal device is provided. The terminal device includes a processor, a memory, and an instruction that is stored in the memory and that can be run on the processor. When the instruction is run, the terminal device is enabled to perform the method in any one of the first aspect or the implementations of the first aspect.

According to a sixth aspect, a network device is provided. The network device includes a processor, a memory, and an instruction that is stored in the memory and that can be run on the processor. When the instruction is run, the network device is enabled to perform the method in any one of the second aspect or the implementations of the second aspect.

According to a seventh aspect, a chip is provided, configured to perform the method in any one of the first aspect or the possible implementations of the first aspect.

According to an eighth aspect, a chip is provided, configured to perform the method in any one of the second aspect or the possible implementations of the second aspect.

According to a ninth aspect, a computer-readable storage medium is provided, including an instruction. When the computer-readable storage medium is run on a communication apparatus, the communication apparatus is enabled to perform the method according to any one of the first aspect or the implementations of the first aspect.

According to a tenth aspect, a computer-readable storage medium is provided, including an instruction. When the computer-readable storage medium is run on a communication apparatus, the communication apparatus is enabled to perform the method according to any one of the second aspect or the implementations of the second aspect.

According to an eleventh aspect, a computer program product including an instruction is provided. When the computer program product runs on a communication apparatus, the communication apparatus is enabled to perform the method according to any one of the first aspect or the implementations of the first aspect.

According to a twelfth aspect, a computer program product including an instruction is provided. When the computer program product runs on a communication apparatus, the communication apparatus is enabled to perform the method according to any one of the second aspect or the implementations of the second aspect.

DESCRIPTION OF EMBODIMENTS

Figure 1:
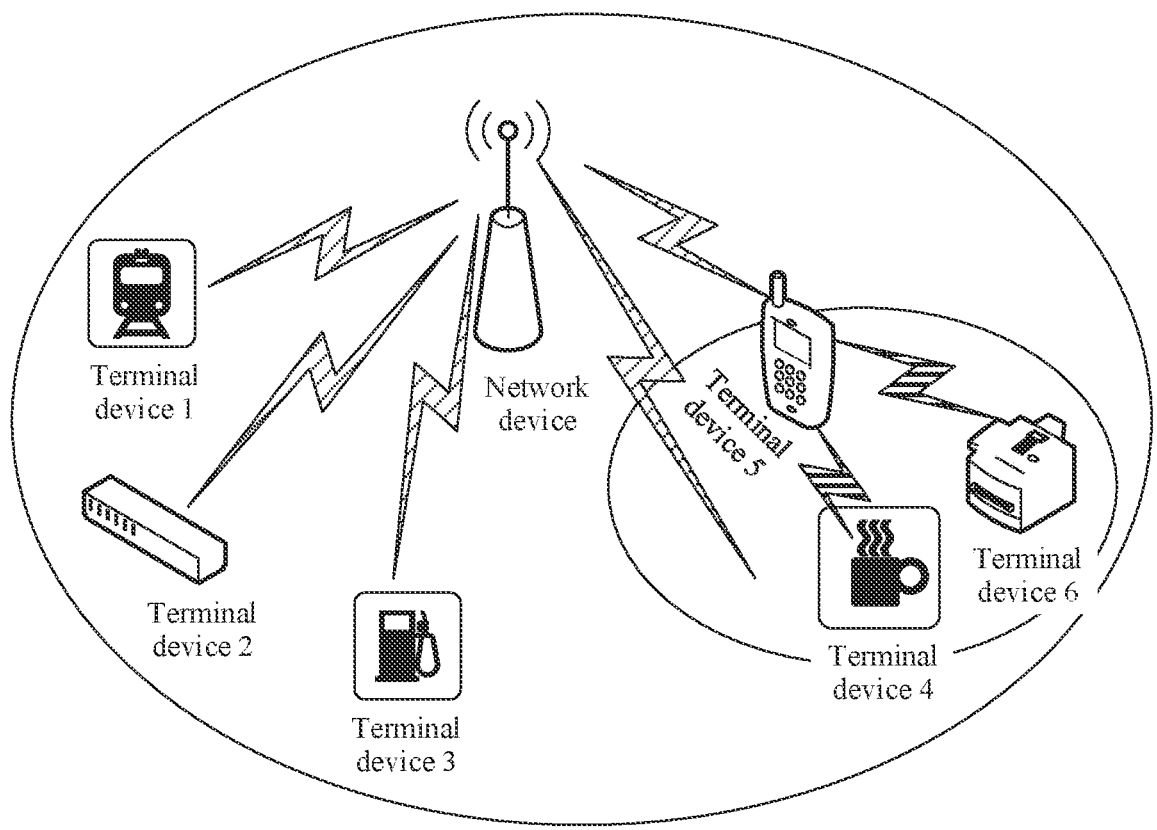
FIG. 1 is a schematic diagram of an architecture of a communications system to which this application may be applied.

The following describes technical solutions of this application with reference to the accompanying drawings.

The technical solutions of embodiments of this application may be applied to various communications systems, such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a future 5th generation (5th generation, 5G) system, a new radio (new radio, NR) system, a new network system and the like.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in the embodiments of this application may be a device configured to communicate with a terminal device. A type of the network device is not specifically limited in this application. For example, the network device may be a base transceiver station (base transceiver station, BTS) in a global system for mobile communications (global system for mobile communications, GSM) system or a code division multiple access (code division multiple access, CDMA) system, or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a cloud radio access network (cloud radio access network, CRAN) scenario. Alternatively, the network device may be a repeater, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system a Unix operating system, an Android operating system, an iOS operating system, or a Windows operating system. The application layer includes applications such as a browser, an address book, word processing software, and instant communication software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program and that is in the terminal device or the network device.

In addition, each aspect or feature of this application may be implemented as a method, an apparatus or a product that uses standard programming and/or engineering technologies. The term "product" used in this application covers a computer program that can be accessed from any computer readable device, carrier or medium. For example, the computer-readable medium may include but is not limited to, a magnetic storage component (for example, a hard disk, a floppy disk or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or cam an instruction and/or data.

The following uses an LTE system as an example for description.

FIG. 1 is a schematic diagram of an architecture of a communications system to which this application may be applied. As shown in FIG. 1, a network device and a terminal device 1 to a terminal device 6 form a communications system. In the communications system, the terminal device 1 to the terminal device 6 may send uplink data to the network device, the network device needs to receive the uplink data sent by the terminal device 1 to the terminal device 6, and the network device may also send downlink data to the terminal device 1 to the terminal device 6. In addition, the terminal device 4 to the terminal device 6 may also form a communications system. In the communications system, the terminal device 4 and the terminal device 6 may send uplink data to the terminal device 5, and the terminal device 5 may also send downlink data to the terminal device 4 and the terminal device 6.

In a wireless communications system, a terminal device has two modes. One is a connected mode, indicating that the terminal device has established a connection to a network device and can directly communicate with the network device. The other is an idle mode, or referred to as a sleep mode, indicating that the terminal device cannot directly communicate with a network device. To ensure that the network device can effectively find the terminal device in idle mode, the network device usually uses paging, in other words, sends a paging signal to the terminal device periodically, to indicate whether the terminal device needs to switch from the idle mode to the connected mode and communicate with the network device. When there is no service to be sent or received, the terminal device may enter the idle mode to reduce power consumption. For a terminal device in idle mode, when the network device needs to send a service to the terminal device or needs the terminal device to report some services, the network device may notify the terminal device by using a paging mechanism. After receiving a paging notification, the terminal device may wake up and enter the connected mode, to send or receive service data.

Figure 2:
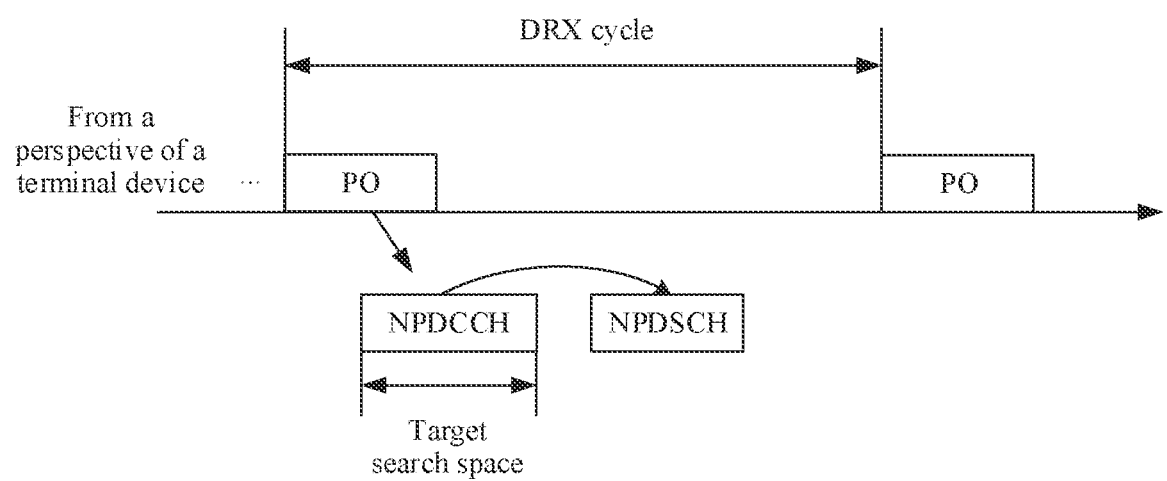
FIG. 2 is a schematic diagram of paging from a perspective of a terminal.

FIG. 2 is a schematic diagram of paging from a perspective of a terminal device. A terminal device in idle mode periodically wakes up to monitor a paging message, to check whether there is a paging indication for the terminal device. As shown in FIG. 2, a cycle in which the terminal device wakes up periodically is referred to as a discontinuous reception (discontinuous reception. DRX) cycle, and the DRX cycle may be indicated by a system message. A position at which the terminal device wakes up is referred to as a PO (paging occasion, paging occasion). The terminal device monitors an NPDCCH at the PO. The terminal device in idle mode sleeps in most of time in the DRX cycle, and wakes up only at the corresponding PO to monitor the NPDCCH. The terminal device needs to detect only one PO in the DRX cycle.

In an existing system, a terminal device always first detects target search space to determine whether there is corresponding downlink scheduling (for example, NPDCCH scheduling). If an NPDCCH is detected in the target search space, the terminal device receives a narrowband physical downlink shared channel (narrow band physical downlink shared channel, NPDSCH) based on indication information carried on the detected NPDCCH. If no NPDCCH is detected in the target search space, the terminal device does not receive an NPDSCH.

The terminal device usually detects an NPDCCH in a blind detection manner in NPDCCH target search space (search space). The NPDCCH target search space is a set of candidate positions (candidate) at which a target NPDCCH may appear. A PO indicates a start position from which the terminal device monitors an NPDCCH, so that a start position of target search space is determined, and blind detection is performed based on the position. The terminal device sequentially blindly detects different candidate positions in the search space in which a PO position is used as the start position, until detection succeeds. If detection on all of the candidate positions fails, it is considered that the network device does not send an NPDCCH. For an NB-IoT system, a receiving time of an NPDCCH may be relatively long, and a blind detection algorithm is complex. Therefore, power consumption is very high when the terminal device monitors the NPDCCH at the PO.

Figure 3:
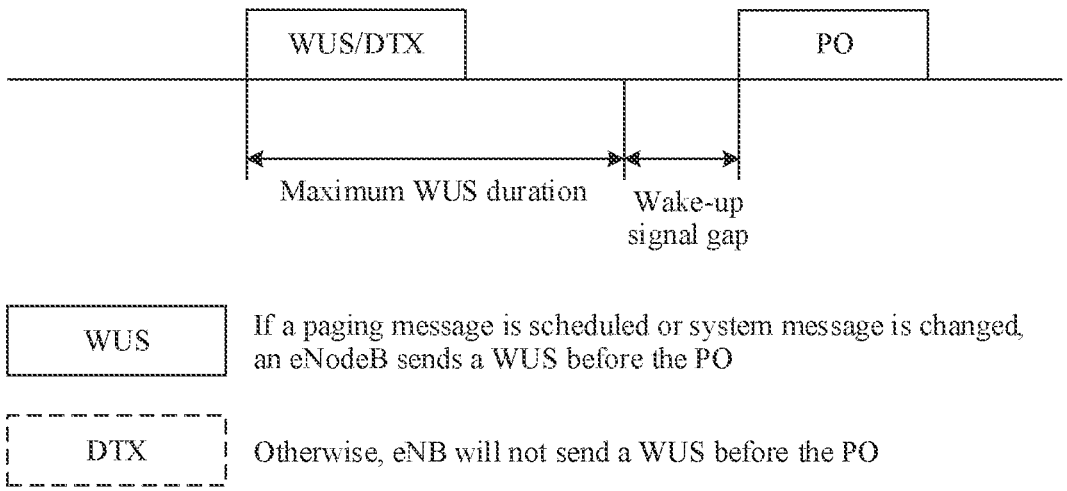
FIG. 3 is a schematic diagram of a paging indication signal from a perspective of a network device.

As a result, a wake-up signal (wake-up signal, WUS) is introduced in NB-IoT R15, to indicate whether a terminal device needs to be woken up at a PO position to receive and detect a subsequent NPDCCH. Specifically, from the perspective of the terminal device, the terminal device detects a wake-up signal before a PO. If the WUS signal is detected, the terminal device detects a subsequent NPDCCH; if no WUS signal is detected, the terminal device does not detect a subsequent NPDCCH. FIG. 3 is a schematic diagram of a paging indication signal from a perspective of a network device. As shown in FIG. 3, from the perspective of the network device, when there is an NPDCCH on a PO, for example, a terminal device needs to be paged or a system message changes, the network device sends a wake-up signal WUS before the PO when there is no NPDCCH on a PO, the network device does not send any signal, which is discontinuous transmission (discontinuous transmission, DTX).

However, the standard does not specify a position at which a WUS signal appears. In this case, the terminal device can learn, only by performing multiple times of blind detection, where the network device sends the WUS signal, or even cannot determine whether the network device sends the WUS signal. This significantly increases power consumption of the terminal device.

This application provides a method for detecting a wake-up signal and a terminal device, so that the terminal device can determine a position for detecting a wake-up signal, thereby reducing power consumption of the terminal device.

Figure 4:
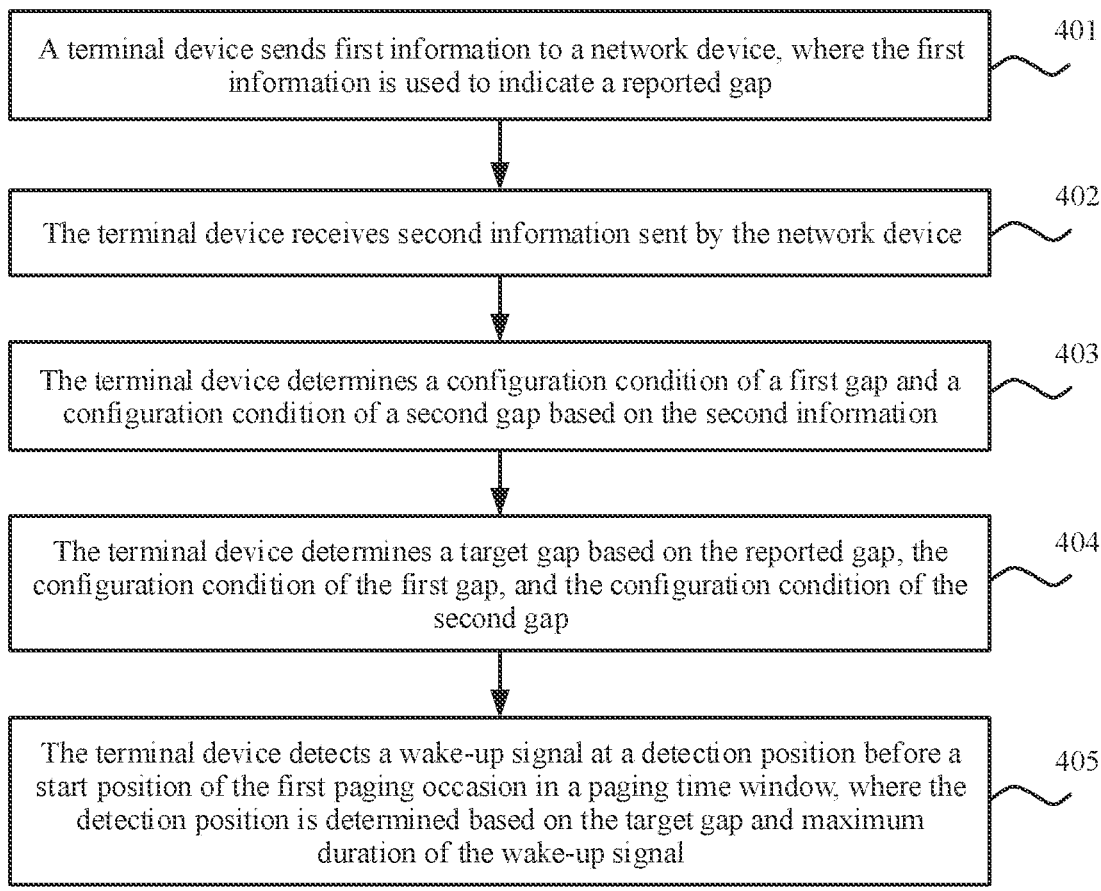
FIG. 4 is a schematic flowchart of a method for detecting a wake-up signal according to an embodiment of this application.

FIG. 4 is a schematic flowchart of a method for detecting a wake-up signal according to an embodiment of this application. The method in FIG. 4 may be performed by a terminal device, and includes at least a part of the following content.

401. A terminal device sends first information to a network device, where the first information is used to indicate a reported gap.

402. The terminal device receives second information sent by the network device.

403. The terminal device determines a configuration condition of a first gap and a configuration condition of a second gap based on the second information.

404. The terminal device determines a target gap based on the reported gap, the configuration condition of the first gap, and the configuration condition of the second gap.

405. The terminal device detects a wake-up signal at a detection position before a start position of the first paging occasion PO in a paging time window PTW, where the detection position is determined based on the target gap and maximum duration of the wake-up signal.

In the foregoing technical solution, the terminal device determines the target gap based on the reported gap, the configuration condition of the first gap, and the configuration condition of the second gap, and further determines the position for detecting the wake-up signal with reference to configured maximum duration of the wake-up signal, so that the terminal device can be prevented from blindly detecting the wake-up signal, thereby reducing power consumption of the terminal device.

The following separately describes steps 401 to 405 in detail.

401. A terminal device sends first information to a network device, where the first information is used to indicate a reported gap.

During WUS detection, the terminal device may perform only sequence correlation. Therefore, most circuits may be turned off to reduce power consumption.

Only after detecting a WUS, the terminal device needs to turn on another circuit, load a memory, and the like, to demodulate an NPDCCH on the PO. This requires a period of time (warm up time).

Optionally, the reported gap is a time period required for turning on the another circuit, loading the memory, and the like.

For example, if the reported gap is 40 ms, it indicates that after detecting the WUS, the terminal device needs at least 40 ms to complete preparation work of "turning on the another circuit, loading the memory, and the like", to demodulate the NPDCCH on the PO.

Therefore, the reported gap may reflect a capability of the terminal device. Generally, a longer reported gap indicates a weaker capability of the terminal device (slower memory loading).

Optionally, the terminal device is a terminal device with extended discontinuous reception (extend discontinuous reception, eDRX) configuration.

Optionally, the terminal device with eDRX configuration may be in eDRX mode.

First, for a terminal device without eDRX configuration, the terminal device is in light sleep (light sleep) in a time other than a PO, and most circuits may be turned off to reduce power consumption. The terminal device wakes up, on a basis of a cycle, to detect a PO. The cycle is referred to as a DRX cycle (DRX cycle). For example, a value of the DRX cycle may be {1.28 s, . . . , 10.24 s}.

Therefore, the terminal device without eDRX configuration needs to wake up at least once every 10.24 s (because a maximum DRX cycle is 10.24 s).

Figure 5:
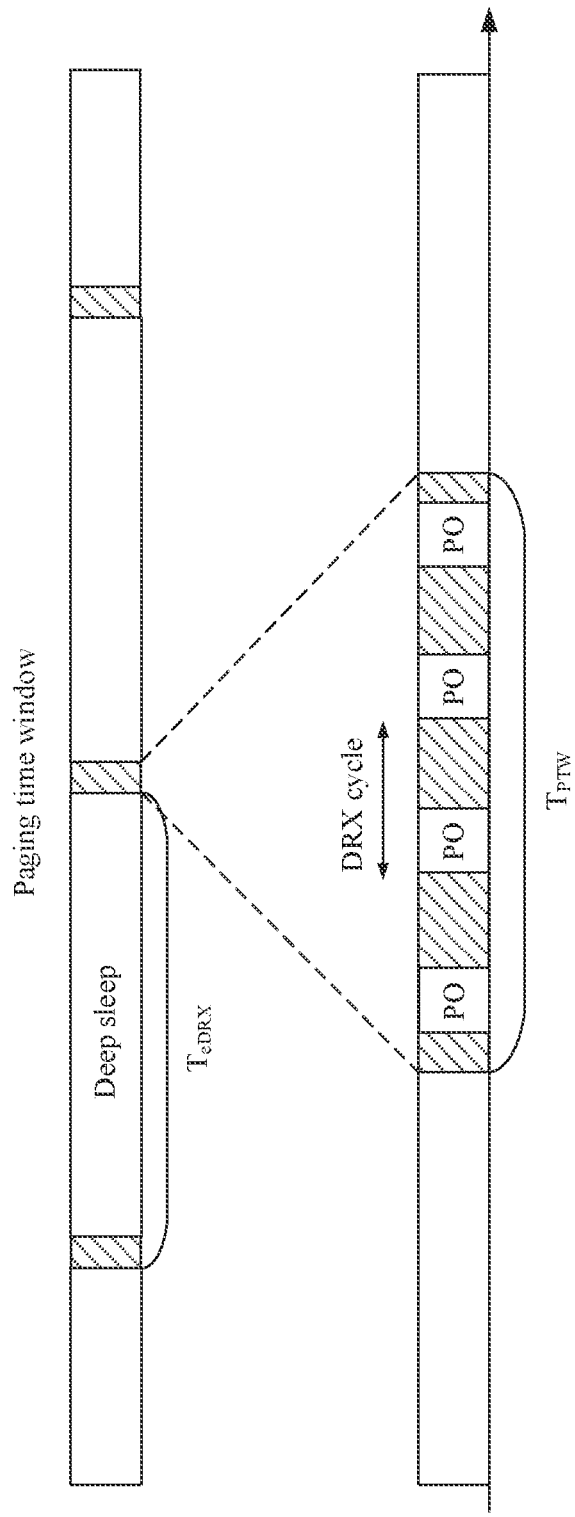
FIG. 5 is a schematic diagram of eDRX in idle mode according to an embodiment of this application.

Compared with a terminal device without eDRX configuration, a terminal device with eDRX configuration has a paging time window (paging time window, PTW) in time domain, as shown in FIG. 5. The terminal device with eDRX configuration wakes up only inside the PTW, and behavior inside the PTW is the same as behavior of the terminal device without eDRX configuration. A maximum PTW cycle is 2.9 hours, which means that the terminal device with eDRX configuration can wake up once every 2.9 hours.

The terminal device is in deep sleep (deep sleep) mode outside the PTW. Compared with light sleep mode, in deep sleep mode, more circuits can be turned off. Therefore, the eDRX mode is a mode that saves more power than DRX.

Similarly, in eDRX, a longer warm up time (corresponding to a longer WUS gap) is required after a WUS is detected.

It should be understood that a wake-up signal before the first paging occasion in a PTW may be in the PTW, or may be outside the PTW.

For the terminal device with eDRX configuration, the terminal device definitely reports a wake-up signal gap (WUS gap or WUS offset). As shown in FIG. 3, the wake-up signal gap is a gap between a PO start position and an end position of configured maximum wake-up signal duration (configured maximum WUS duration).

Optionally, the reported gap is a wake-up signal gap.

Optionally, a value range of the wake-up signal gap may be {40 ms, 240 ms, 1 s, 2 s}.

For example, when the terminal device with eDRX configuration reports 240 ms, it indicates that the terminal device considers that the terminal device needs 240 ms to complete a warm up operation.

It should be noted herein that, if the terminal device reports is and 2 s, there is a high probability that the terminal device has a WUS-dedicated detection circuit. The terminal device may turn off an original main circuit, and turn on only the WUS-dedicated detection circuit to detect a WUS, and the terminal device turns on the main circuit only after detecting the WUS, achieving ultra-low power consumption.

Therefore, a capability of a terminal device that reports 1 s or 2 s is not necessarily weaker than a capability of a terminal device that reports 40 ms or 240 ms, and it is very likely that the terminal device that reports 1 s or 2 s has an extra WUS-dedicated detection circuit.

In this case, because the main circuit is completely turned off, the terminal device needs a longer warm up time. Therefore, 1 s and 2 s are defined in the standard.

It should be understood that, that the terminal device reports the wake-up signal gap to the network device means that the terminal device reports, to the network device, a minimum period of time that the terminal device needs to complete preparation work.

Optionally, maximum duration of the wake-up signal may be notified by the network device to the terminal device in advance.

In addition, for the terminal device without eDRX configuration, the terminal device does not report a wake-up signal gap.

402. The terminal device receives second information sent by the network device.

Optionally, the network device may send the second information in a broadcast manner.

For example, the network device sends, in a cell, broadcast information to the terminal device in the cell, and the second information may be the broadcast information.

403. The terminal device determines a configuration condition of a first gap and a configuration condition of a second gap based on the second information.

Optionally, the network device may configure a same first gap or second gap for a plurality of terminal devices in the cell based on a plurality of reported gaps reported by the plurality of terminal devices.

Alternatively, the network device may configure different first gaps or second gaps for a plurality of terminal devices in the cell based on a plurality of reported gaps reported by the plurality of terminal devices.

Optionally, the first gap may be equal to the reported gap.

Alternatively, the first gap may not be equal to the reported gap.

In other words, the first gap configured by the network device for the terminal device is not necessarily equal to the reported gap reported by the terminal device. The first gap depends on implementation of the network device.

For example, there may be hundreds or thousands of terminal devices in one cell, and each terminal device reports a different reported gap. Therefore, the network device cannot match requirements of all the terminal devices.

Optionally, the terminal device is a terminal device with eDRX configuration.

The network device definitely configures an eDRX short gap for a terminal device with eDRX configuration.

Optionally, the first gap may be the eDRX short gap.

Optionally, a value range of the eDRX short gap may be {40 ms, 80 ms, 160 ms, 240 ms}.

In other words, the configuration condition of the first gap may include: The first gap is set to 40 ms, the first gap is set to 80 ms, the first gap is set to 160 ms, and the first gap is set to 240 ms.

In addition, for a terminal device without DRX configuration, the network device definitely configures a DRX gap (DRX gap or DRX offset) for the terminal device.

Optionally, a value range of the DRX gap may be {40 ms, 80 ms, 160 ms, 240 ms}.

Optionally, the eDRX short gap is greater than or equal to the DRX gap.

For example, when the DRX gap is equal to 40 ms, a value range of the eDRX short gap may be {80 ms, 160 ms, 240 ms}.

Figure 6:
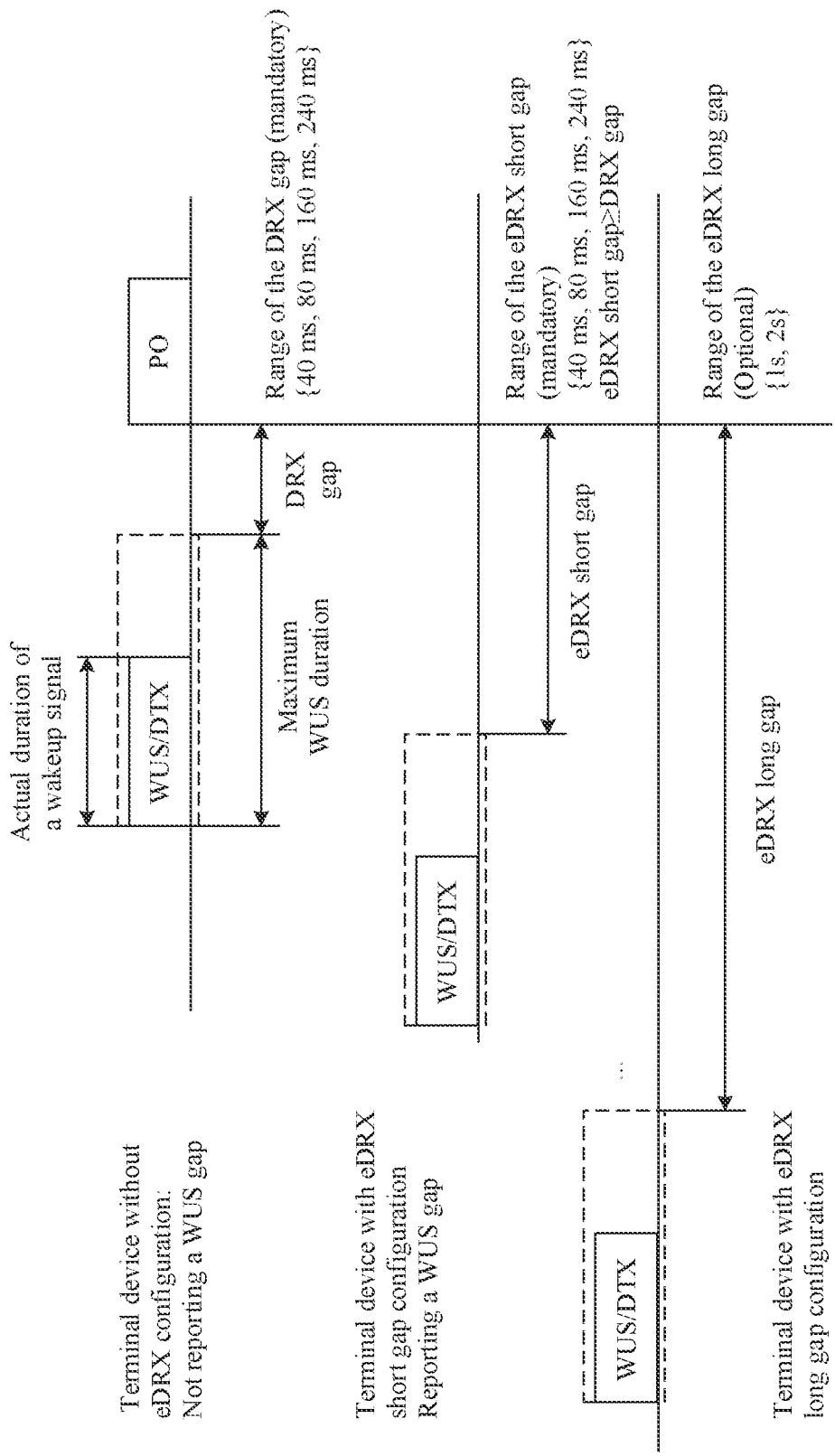
FIG. 6 is a schematic diagram of a relationship among a DRX gap, an eDRX short gap, and an eDRX long gap according to an embodiment of this application.

FIG. 6 shows a relationship between the DRX gap, the eDRX short gap, and an eDRX long gap. Optionally, the second gap may be an eDRX long gap.

Optionally, the configuration condition of the second gap may include: The second gap is not configured, the second gap is set to 1 s, and the second gap is set to 2 s.

In other words, the network device may configure an eDRX long gap for a terminal device with eDRX configuration.

404. The terminal device determines a target gap based on the reported gap, the configuration condition of the first gap, and the configuration condition of the second gap.

The target gap is a wake-up signal gap that is actually used by the terminal device to detect a wake-up signal and that is actually used by the network device to send a wake-up signal.

Optionally, when the reported gap is 1 s, the first gap is set to 40 ms, and the second gap is not configured, it is determined that the target gap is 40 ms.

Optionally, when the reported gap is 1 s, the first gap is set to 40 ms, and the second gap is not configured, the target gap is determined based on the first gap (namely, the eDRX short gap).

For example, the target gap may be ½ times, 2 times, or the like of the eDRX short gap, that is, 20 ms, 80 ms, or the like.

Optionally, when the reported gap is 1 s, the first gap is set to 80 ms, and the second gap is not configured, it is determined that the target gap is 80 ms.

Optionally, when the reported gap is 1 s, the first gap is set to 80 ms, and the second gap is not configured, the target gap is determined based on the first gap (namely, the eDRX short gap).

For example, the target gap may be ½ times, 2 times, or the like of the eDRX short gap, that is, 40 ms, 160 ms, or the like.

Optionally, when the reported gap is 1 s, the first gap is set to 160 ms, and the second gap is not configured, it is determined that the target gap is 160 ms.

Optionally, when the reported gap is 1 s, the first gap is set to 160 ms, and the second gap is not configured, the target gap is determined based on the first gap (namely, the eDRX short gap).

For example, the target gap may be ½ times, 2 times, or the like of the eDRX short gap, that is, 80 ms, 320 ms, or the like.

Optionally, when the reported gap is 1 s, the first gap is set to 240 ms, and the second gap is not configured, it is determined that the target gap is 240 ms.

Optionally, when the reported gap is 1 s, the first gap is set to 240 ms, and the second gap is not configured, the target gap is determined based on the first gap (namely, the eDRX short gap).

For example, the target gap may be ½ times, 2 times, or the like of the eDRX short gap, that is, 120 ms, 480 ms, or the like.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is the eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

Optionally, when the reported gap is 2 s, the first gap is set to 40 ms, and the second gap is not configured, it is determined that the target gap is 40 ms.

Optionally, when the reported gap is 2 s, the first gap is set to 40 ms, and the second gap is not configured, the target gap is determined based on the first gap (namely, the eDRX short gap).

For example, the target gap may be ½ times, 2 times, or the like of the eDRX short gap, that is, 20 ms, 80 ms, or the like.

Optionally, when the reported gap is 2 s, the first gap is set to 80 ms, and the second gap is not configured, it is determined that the target gap is 80 ms.

Optionally, when the reported gap is 2 s, the first gap is set to 80 ms, and the second gap is not configured, the target gap is determined based on the first gap (namely, the eDRX short gap).

For example, the target gap may be ½ times, 2 times, or the like of the eDRX short gap, that is, 40 ms, 160 ms, or the like.

Optionally, when the reported gap is 2 s, the first gap is set to 160 ms, and the second gap is not configured, it is determined that the target gap is 160 ms.

Optionally, when the reported gap is 2 s, the first gap is set to 160 ms, and the second gap is not configured, the target gap is determined based on the first gap (namely, the eDRX short gap).

For example, the target gap may be ½ times, 2 times, or the like of the eDRX short gap, that is, 80 ms, 320 ms, or the like.

Optionally, when the reported gap is 2 s, the first gap is set to 240 ms, and the second gap is not configured, it is determined that the target gap is 240 ms.

Optionally, when the reported gap is 2 s, the first gap is set to 240 ms, and the second gap is not configured, the target gap is determined based on the first gap (namely, the eDRX short gap).

For example, the target gap may be ½ times, 2 times, or the like of the eDRX short gap, that is, 120 ms, 480 ms, or the like.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is the eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

Optionally, when the reported gap is s, the first gap is set to 40 ms, 80 ms, 160 ms, or 240 ms, and the second gap is not configured, it is determined that the target gap is a third gap, where the third gap is 40 ms, 80 ms, 160 ms, or 240 ms.

For example, when the reported gap is 1 s, the first gap is set to 40 ms, 80 ms, 160 ms, or 240 ms, and the second gap is not configured, it is determined that the target gap is 40 ms; when the reported gap is 1 s, the first gap is set to 40 ms, 80 ms, 160 ms, or 240 ms, and the second gap is not configured, it is determined that the target gap is 80 ms; when the reported gap is 1 s, the first gap is set to 40 ms, 80 ms, 160 ms, or 240 ms, and the second gap is not configured, it is determined that the target gap is 160 ms; or when the reported gap is 1 s, the first gap is set to 40 ms, 80 ms, 160 ms, or 240 ms, and the second gap is not configured, it is determined that the target gap is 240 ms.

Optionally, the third gap is configured by the network device for the terminal device.

Optionally, the third gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, it is determined that the target gap is the DRX gap. In this way, the network device does not need a wake-up signal gap that is configured additionally in these cases, thereby reducing overheads of the network device.

Optionally, when the reported gap is 2 s, the first gap is set to 40 ms, 80 ms, 160 ms, or 240 ms, and the second gap is not configured, it is determined that the target gap is a fourth gap, where the fourth gap is 40 ms, 80 ms, 160 ms, or 240 ms.

For example, when the reported gap is 2 s, the first gap is set to 40 ms, 80 ms, 160 ms, or 240 ms, and the second gap is not configured, it is determined that the target gap is 40 ms; when the reported gap is 2 s, the first gap is set to 40 ms, 80 ms, 160 ms, or 240 ms, and the second gap is not configured, it is determined that the target gap is 80 ms; when the reported gap is 2 s, the first gap is set to 40 ms, 80 ms, 160 ms, or 240 ms, and the second gap is not configured, it is determined that the target gap is 160 ms, or when the reported gap is 2 s, the first gap is set to 40 ms, 80 ms, 160 ms, or 240 ms, and the second gap is not configured, it is determined that the target gap is 240 ms.

Optionally, the fourth gap is configured by the network device for the terminal device.

Optionally, the fourth gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, it is determined that the target gap is the DRX gap. In this way, the network device does not need a wake-up signal gap that is configured additionally in these cases, thereby reducing overheads of the network device.

Optionally, when the reported gap is 240 ms and the first gap is set to 40 ms, 80 ms, or 160 ms, it is determined that the target gap is a fifth gap, and the fifth gap is 40 ms, 80 ms, 160 ms, or 240 ms.

For example, when the reported gap is 240 ms and the first gap is set to 40 ms, 80 ms, or 160 ms, it is determined that the target gap is 40 ms; when the reported gap is 240 ms and the first gap is set to 40 ms, 80 ms, or 160 ms, it is determined that the target gap is 80 ms; when the reported gap is 240 ms and the first gap is set to 40 ms, 80 ms, or 160 ms, it is determined that the target gap is 160 ms; or when the reported gap is 240 ms and the first gap is set to 40 ms, 80 ms, or 160 ms, it is determined that the target gap is 240 ms.

It should be understood that in this case, the network device may configure a second gap for the terminal device, or may not configure a second gap for the terminal device.

Optionally, the fifth gap is configured by the network device for the terminal device.

Optionally, the fifth gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 240 ms and the first gap is set to 40 ms, 80 ms, or 160 ms, the target gap is the DRX gap. In this way, the network device does not need a wake-up signal gap that is configured additionally in these cases, thereby reducing overheads of the network device.

It should be understood that the foregoing technical solutions may be used singly, or may be used in combination in a proper manner. This is not limited in this application.

405. The terminal device detects a wake-up signal at a detection position before a start position of the first paging occasion PO in a paging time window PTW, where the detection position is determined based on the target gap and maximum duration of the wake-up signal.

Optionally, the detection position is a position that is before the start position of the first paging occasion PO in the paging time window PTW and that is away from the PO by a sum of the target gap and the maximum duration of the wake-up signal.

For example, if the start position of the PO is T, the target gap is 40 ms, and the maximum WUS duration is 128 ms, then the detection position is T-40-128.

Optionally, the detection position is determined based on the target gap, the maximum duration of the wake-up signal, and delay information.

For example, in NB-IoT, some subframes are invalid subframes or subframes used to transmit a broadcast signal or a synchronization signal. When encountering these subframes, the WUS uses a delay approach so that the subframes cannot be used for WUS transmission, and are not counted, in other words, the subframes are skipped. If the start position of the PO is T, the target gap is 40 ms, the maximum WUS duration is 128 ms, and there are 10 preceding subframes in 128 ms, then the detection position is T-40-128-10.

In the foregoing technical solution, the terminal device determines the target gap based on the reported gap, the configuration condition of the first gap, and the configuration condition of the second gap, and further determines the position for detecting the wake-up signal with reference to the maximum duration of the wake-up signal, so that the terminal device can be prevented from blindly detecting the wake-up signal, thereby reducing the power consumption of the terminal device.

This application provides a method for sending a wake-up signal, so that a terminal device can determine a position for detecting a wake-up signal, thereby reducing power consumption of the terminal device.

Figure 7:
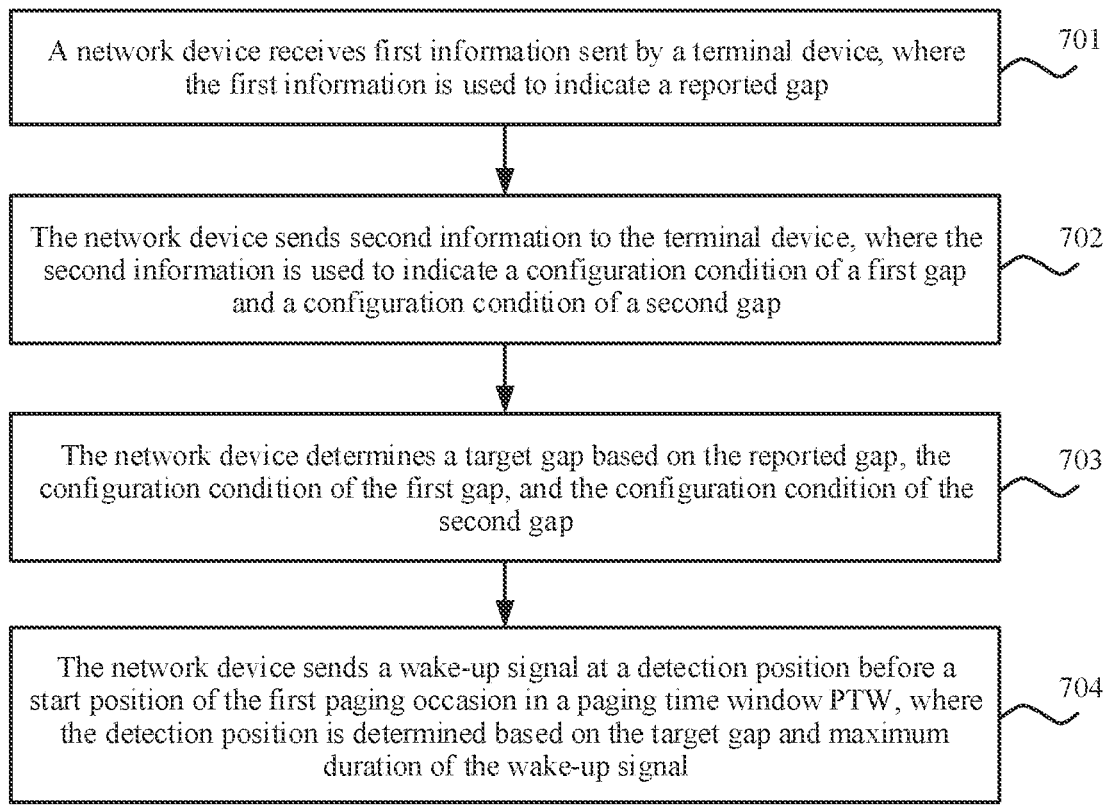
FIG. 7 is a schematic flowchart of a method for sending a wake-up signal according to an embodiment of this application.

FIG. 7 is a schematic flowchart of a method for sending a wake-up signal according to an embodiment of this application. The method in FIG. 7 may be performed by a network device, and includes at least a part of the following content.

701. A network device receives first information sent by a terminal device, where the first information is used to indicate a reported gap.

702. The network device sends second information to the terminal device, where the second information is used to indicate a configuration condition of a first gap and a configuration condition of a second gap.

703. The network device determines a target gap based on the reported gap, the configuration condition of the first gap, and the configuration condition of the second gap.

704. The network device sends a wake-up signal at a detection position before a start position of the first paging occasion in a paging time window PTW, where the detection position is determined based on the target gap and maximum duration of the wake-up signal.

In the foregoing technical solution, the network device determines the target gap based on the reported gap, the configuration condition of the first gap, and the configuration condition of the second gap, and further determines the position for detecting the wake-up signal with reference to the maximum duration of the wake-up signal, so that the terminal device can be prevented from blindly detecting the wake-up signal, thereby reducing power consumption of the terminal device.

The following separately describes steps 701 to 704 in detail.

701. A network device receives first information sent by a terminal device, where the first information is used to indicate a reported gap.

Optionally, the reported gap is a time period required for turning on another circuit, loading a memory, and the like.

For example, if the reported gap is 40 ms, it indicates that after detecting the WUS, the terminal device needs at least 40 ms to complete preparation work of "turning on another circuit, loading a memory, and the like", to demodulate the NPDCCH on the PO.

Optionally, the reported gap is a wake-up signal gap.

Optionally, a value range of the wake-up signal gap may be {40 ms, 240 ms, 1 s, 2 s}.

For example, when a terminal device with eDRX configuration reports 240 ms, it indicates that the terminal device considers that the terminal device needs 240 ms to complete a warm up operation.

It should be understood that, that the terminal device reports the wake-up signal gap to the network device means that the terminal device reports, to the network device, a minimum period of time that the terminal device needs to complete preparation work.

702. The network device sends second information to the terminal device, where the second information is used to indicate a configuration condition of a first gap and a configuration condition of a second gap.

Optionally, the network device may send the second information in a broadcast manner.

For example, the network device sends, in a cell, broadcast information to the terminal device in the cell, and the second information may be the broadcast information.

Optionally, the network device may configure a same first gap or a same second gap for a plurality of terminal devices in the cell based on a plurality of reported gaps reported by the plurality of terminal devices.

Alternatively, the network device may configure different first gaps or a same second gap for a plurality of terminal devices in the cell based on a plurality of reported gaps reported by the plurality of terminal devices.

Optionally, the first gap may be equal to the reported gap.

Alternatively, the first gap may not be equal to the reported gap.

In other words, the first gap configured by the network device for the terminal device is not necessarily equal to the reported gap reported by the terminal device. The first gap depends on implementation of the network device.

For example, there may be hundreds or thousands of terminal devices in one cell, and each terminal device reports a different reported gap. Therefore, the network device cannot match requirements of all the terminal devices.

Optionally, the terminal device is a terminal device with eDRX configuration.

The network device definitely configures an eDRX short gap for a terminal device with eDRX configuration.

Optionally, the first gap may be the eDRX short gap.

Optionally, a value range of the eDRX short gap may be {40 ms, 80 ms, 160 ms, 240 ms}.

In other words, the configuration condition of the first gap may include: The first gap is set to 40 ms, the first gap is set to 80 ms, the first gap is set to 160 ms, and the first gap is set to 240 ms.

In addition, for a terminal device without DRX configuration, the network device definitely configures a DRX gap (DRX gap or DRX offset) for the terminal device.

Optionally, a value range of the DRX gap may be {40 ms, 80 ms, 160 ms, 240 ms}.

Optionally, the eDRX short gap is greater than or equal to the DRX gap.

For example, when the DRX gap is equal to 40 ms, a value range of the eDRX short gap may be {80 ms, 160 ms, 240 ms}.

FIG. 6 shows a relationship between the DRX gap, the eDRX short gap, and an eDRX long gap.

Optionally, the second gap may be an eDRX long gap.

Optionally, the configuration condition of the second gap may include: The second gap is not configured, the second gap is set to 1 s, and the second gap is set to 2 s.

In other words, the network device may configure an eDRX long gap for a terminal device with eDRX configuration.

703. The network device determines a target gap based on the reported gap, the configuration condition of the first gap, and the configuration condition of the second gap.

The target gap is a wake-up signal gap that is actually used by the terminal device to detect a wake-up signal and that is actually used by the network device to send a wake-up signal.

Optionally, when the reported gap is 1 s, the first gap is set to 40 ms, and the second gap is not configured, it is determined that the target gap is 40 ms.

Optionally, when the reported gap is 1 s, the first gap is set to 40 ms, and the second gap is not configured, the target gap is determined based on the first gap (namely, the eDRX short gap).

For example, the target gap may be ½ times, 2 times, or the like of the eDRX short gap, that is, 20 ms, 80 ms, or the like.

Optionally, when the reported gap is 1 s, the first gap is set to 80 ms, and the second gap is not configured, it is determined that the target gap is 80 ms.

Optionally, when the reported gap is 1 s, the first gap is set to 80 ms, and the second gap is not configured, the target gap is determined based on the first gap (namely, the eDRX short gap).

For example, the target gap may be ½ times, 2 times, or the like of the eDRX short gap, that is, 40 ms, 160 ms, or the like.

Optionally, when the reported gap is 1 s, the first gap is set to 160 ms, and the second gap is not configured, it is determined that the target gap is 160 ms.

Optionally, when the reported gap is 1 s, the first gap is set to 160 ms, and the second gap is not configured, the target gap is determined based on the first gap (namely, the eDRX short gap).

For example, the target gap may be ½ times, 2 times, or the like of the eDRX short gap, that is, 80 ms, 320 ms, or the like.

Optionally, when the reported gap is 1 s, the first gap is set to 240 ms, and the second gap is not configured, it is determined that the target gap is 240 ms.

Optionally, when the reported gap is 1 s, the first gap is set to 240 ms, and the second gap is not configured, the target gap is determined based on the first gap (namely, the eDRX short gap).

For example, the target gap may be ½ times, 2 times, or the like of the eDRX short gap, that is, 80 ms, 480 ms, or the like.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, the target gap is the eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

Optionally, when the reported gap is 2 s, the first gap is set to 40 ms, and the second gap is not configured, it is determined that the target gap is 40 ms.

Optionally, when the reported gap is 2 s, the first gap is set to 40 ms, and the second gap is not configured, the target gap is determined based on the first gap (namely, the eDRX short gap).

For example, the target gap may be ½ times, 2 times, or the like of the eDRX short gap, that is, 20 ms, 80 ms, or the like.

Optionally, when the reported gap is 2 s, the first gap is set to 80 ms, and the second gap is not configured, it is determined that the target gap is 80 ms.

Optionally, when the reported gap is 2 s, the first gap is set to 80 ms, and the second gap is not configured, the target gap is determined based on the first gap (namely, the eDRX short gap).

For example, the target gap may be ½ times, 2 times, or the like of the eDRX short gap, that is, 40 ms, 160 ms, or the like.

Optionally, when the reported gap is 2 s, the first gap is set to 160 ms, and the second gap is not configured, it is determined that the target gap is 160 ms.

Optionally, when the reported gap is 2 s, the first gap is set to 160 ms, and the second gap is not configured, the target gap is determined based on the first gap (namely, the eDRX short gap).

For example, the target gap may be ½ times, 2 times, or the like of the eDRX short gap, that is, 80 ms, 320 ms, or the like.

Optionally, when the reported gap is 2 s, the first gap is set to 240 ms, and the second gap is not configured, it is determined that the target gap is 240 ms.

Optionally, when the reported gap is 2 s, the first gap is set to 240 ms, and the second gap is not configured, the target gap is determined based on the first gap (namely, the eDRX short gap).

For example, the target gap may be ½ times, 2 times, or the like of the eDRX short gap, that is, 80 ms, 480 ms, or the like.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, the target gap is the eDRX short gap. In comparison with a case in which the target gap is a DRX gap, the terminal device may detect the wake-up signal in eDRX mode. In this way, a period of time in which the terminal device is in eDRX mode can be prolonged as much as possible, thereby further reducing the power consumption of the terminal device.

Optionally, when the reported gap is s, the first gap is set to 40 ms, 80 ms, 160 ms, or 240 ms, and the second gap is not configured, it is determined that the target gap is a third gap, where the third gap is 40 ms, 80 ms, 160 ms, or 240 ms.

For example, when the reported gap is 1 s, the first gap is set to 40 ms, 80 ms, 160 ms, or 240 ms, and the second gap is not configured, it is determined that the target gap is 40 ms; when the reported gap is 1 s, the first gap is set to 40 ms, 80 ms, 160 ms, or 240 ms, and the second gap is not configured, it is determined that the target gap is 80 ms: when the reported gap is 1 s, the first gap is set to 40 ms, 80 ms, 160 ms, or 240 ms, and the second gap is not configured, it is determined that the target gap is 160 ms; or when the reported gap is 1 s, the first gap is set to 40 ms, 80 ms, 160 ms, or 240 ms, and the second gap is not configured, it is determined that the target gap is 240 ms.

Optionally, the third gap is configured by the network device for the terminal device.

Optionally, the third gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 1 s and the network device does not configure an eDRX long gap, it is determined that the target gap is the DRX gap. In this way, the network device does not need a wake-up signal gap that is configured additionally in these cases, thereby reducing overheads of the network device.

Optionally, when the reported gap is 2 s, the first gap is set to 40 ms, 80 ms, 160 ms, or 240 ms, and the second gap is not configured, it is determined that the target gap is a fourth gap, where the fourth gap is 40 ms, 80 ms, 160 ms, or 240 ms.

For example, when the reported gap is 2 s, the first gap is set to 40 ms, 80 ms, 160 ms, or 240 ms, and the second gap is not configured, it is determined that the target gap is 40 ms; when the reported gap is 2 s, the first gap is set to 40 ms, 80 ms, 160 ms, or 240 ms, and the second gap is not configured, it is determined that the target gap is 80 ms; when the reported gap is 2 s, the first gap is set to 40 ms, 80 ms, 160 ms, or 240 ms, and the second gap is not configured, it is determined that the target gap is 160 ms; or when the reported gap is 2 s, the first gap is set to 40 ms, 80 ms, 160 ms, or 240 ms, and the second gap is not configured, it is determined that the target gap is 240 ms.

Optionally, the fourth gap is configured by the network device for the terminal device.

Optionally, the fourth gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 2 s and the network device does not configure an eDRX long gap, it is determined that the target gap is the DRX gap. In this way, the network device does not need a wake-up signal gap that is configured additionally in these cases, thereby reducing overheads of the network device.

Optionally, when the reported gap is 240 ms and the first gap is set to 40 ms, 80 ms, or 160 ms, it is determined that the target gap is a fifth gap, and the fifth gap is 40 ms, 80 ms, 160 ms, or 240 ms.

For example, when the reported gap is 240 ms and the first gap is set to 40 ms, 80 ms, or 160 ms, it is determined that the target gap is 40 ms: when the reported gap is 240 ms and the first gap is set to 40 ms, 80 ms, or 160 ms, it is determined that the target gap is 80 ms; when the reported gap is 240 ms and the first gap is set to 40 ms, 80 ms, or 160 ms, it is determined that the target gap is 160 ms; or when the reported gap is 240 ms and the first gap is set to 40 ms, 80 ms, or 160 ms, it is determined that the target gap is 240 ms.

It should be understood that in this case, the network device may configure a second gap for the terminal device, or may not configure a second gap for the terminal device.

Optionally, the fifth gap is configured by the network device for the terminal device.

Optionally, the fifth gap is a DRX gap.

According to the foregoing technical solution, the terminal device may determine the position for detecting the wake-up signal, so that the terminal device can be prevented from blindly detecting the wake-up signal, thereby reducing the power consumption of the terminal device.

In addition, in the foregoing technical solution, when the reported gap is 240 ms and the first gap is set to 40 ms, 80 ms, or 160 ms, the target gap is the DRX gap. In this way, the network device does not need a wake-up signal gap that is configured additionally in these cases, thereby reducing overheads of the network device.

It should be understood that the foregoing technical solutions may be used singly, or may be used in combination in a proper manner. This is not limited in this application.

704. The network device sends a wake-up signal at a detection position before a start position of the first paging occasion PO in a paging time window PTW, where the detection position is determined based on the target gap and maximum duration of the wake-up signal.

Optionally, the detection position is a position that is before the start position of the first paging occasion PO in the paging time window PTW and that is away from the PO by a sum of the target gap and the maximum duration of the wake-up signal.

For example, if the start position of the PO is T, the target gap is 40 ms, and the maximum WUS duration is 128 ms, then the detection position is T-40-128.

Optionally, the detection position is determined based on the target gap, the maximum duration of the wake-up signal, and delay information.

For example, in NB-IoT, some subframes are invalid subframes or subframes used to transmit a broadcast signal or a synchronization signal. When encountering these subframes, the WUS uses a delay approach so that the subframes cannot be used for WUS transmission, and are not counted, in other words, the subframes are skipped. If the start position of the PO is T, the target gap is 40 ms, the maximum WUS duration is 128 ms, and there are 10 preceding subframes in 128 ms, then the detection position is T-40-128-10.

In the foregoing technical solution, the terminal device determines the target gap based on the reported gap, the configuration condition of the first gap, and the configuration condition of the second gap, and further determines the position for detecting the wake-up signal with reference to the maximum duration of the wake-up signal, so that the terminal device can be prevented from blindly detecting the wake-up signal, thereby reducing the power consumption of the terminal device.

The following describes this embodiment of this application in more detail with reference to specific examples.

Table 1 is a correspondence among the reported gap, the first gap, the second gap, and the target gap in this embodiment of this application. It can be learned from Table 1 that, for eDRX, the terminal device may report four values, the network device has 12 configurations, and there are a total of 4×12=48 cases. Each case may be uniquely determined by using the reported gap (a value reported by the terminal device), the first gap and the second gap (a value configured by the network device for eDRX, and also a value configured by the network device for the terminal device).

For the 12 configurations of the network device, 40 ms indicates that the network device sets one eDRX short gap to 40 ms for the terminal device, and no eDRX long gap is configured. The second gap in another similar form where there is only one value corresponding to the value configured by the network device for eDRX has a similar sense, 40 ms+1 s indicates that the network device sets one eDRX short gap to 40 ms and one eDRX long gap to is for the terminal device. A configuration in another similar form where there are two different values corresponding to the value configured by the network device for eDRX has a similar sense.

For example, the detection position is a position that is before the start position of the first paging occasion PO in the paging time window PTW and that is away from the PO by a sum of the target gap and the configured maximum duration of the wake-up signal.

It is assumed that a DRX gap configured by the network device in this case is 40 ms, and the maximum wake-up signal duration is 128 ms.

When the value reported by the terminal device is 40 ms, and the value configured by the network device for the eDRX is 240 ms, it indicates that the terminal device reports a WUS gap to be 40 ms, and the network device only sets the eDRX short gap to 240 ms, and does not configure an eDRX long gap. In this case, a WUS gap corresponding to the terminal device is 240 ms, in other words, the network device sends a WUS of the terminal device at 240 ms+128 ms, and the terminal device detects the WUS at 240 ms+128 ms.

When the value reported by the terminal device is 40 ms, and the value configured by the network device for the eDRX is 240 ms+1 s, it indicates that the terminal device reports a WUS gap to be 40 ms, and the network device sets the eDRX short gap to 240 ms, and additionally sets the eDRX long gap to 1 s. In this case, a WUS gap corresponding to the terminal device is 240 ms, in other words, the network device sends a WUS of the terminal device at 240 ms+128 ms, and the terminal device detects the WUS at 240 ms+128 ms.

When the value reported by the terminal device is 1 s, and the value configured by the network device for the eDRX is 240 ms+1 s, it indicates that the terminal device reports a WUS gap to be is (indicating that the terminal device is likely to have a WUS-dedicated detection circuit), and the network device sets the eDRX short gap to 240 ms, and additionally sets the eDRX long gap to 1 s. In this case, a WUS gap corresponding to the terminal device is 1 s, in other words, the network device sends a WUS of the terminal device at 1 s+128 ms, and the terminal device detects the WUS at 1 s+128 ms.

Figure 8:
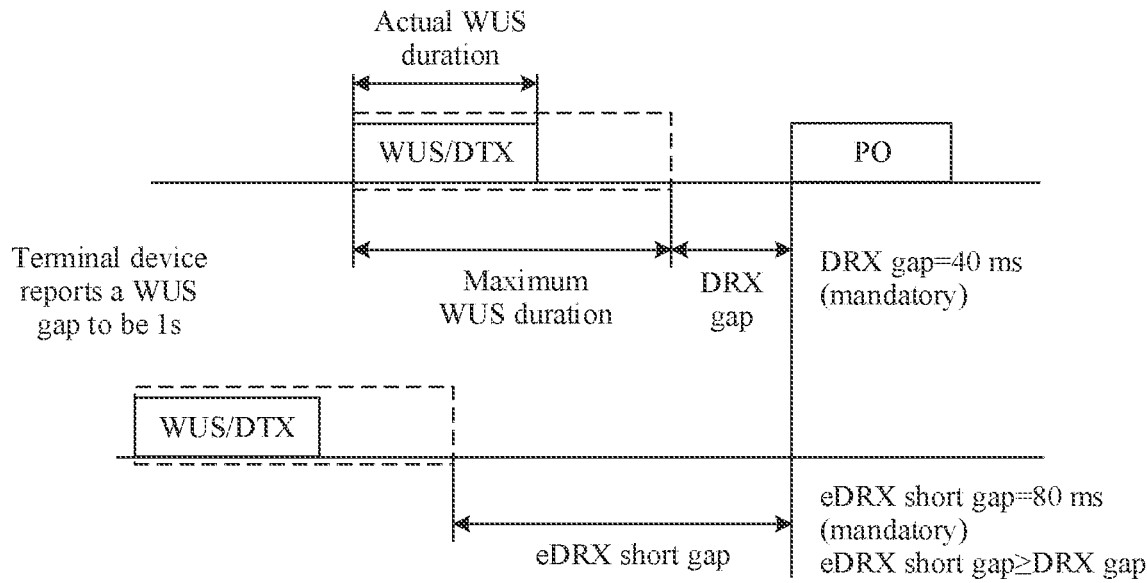
FIG. 8 is a schematic diagram of a paging indication signal when a target gap is a DRX gap.

When the value reported by the terminal device is 1 s, and the value configured by the network device for the eDRX is 80 ms, it indicates that the terminal device reports a WUS gap to be 1 s, and the network device sets the eDRX short gap to 80 ms, and does not configure an eDRX long gap. In this case, a DRX gap corresponding to the terminal device is 40 ms, in other words, the network device sends a WUS of the terminal device at DRX gap+128 ms=40 ms+128 ms, and the terminal device detects the WUS at DRX gap+128 ms=40 ms+128 ms, as shown in FIG. 8.

Other cases in the table are similar.

In the foregoing technical solution, the terminal device determines the target gap based on the reported gap, the first gap, and the second gap, and further determines the position for detecting the wake-up signal with reference to the maximum duration of the wake-up signal, so that the terminal device can be prevented from blindly detecting the wake-up signal, thereby reducing the power consumption of the terminal device.

In addition, in the foregoing technical solution, when the reported gap is 240 ms and the first gap is 40 ms, 80 ms, or 160 ms, and when the reported gap is 1 s or 2 s and the network device does not configure an eDRX long gap, it is determined that the target gap is the DRX gap. In this way, the network device does not need a wake-up signal gap that is configured additionally in these cases, thereby reducing overheads of the network device.

Table 2 is another correspondence among the reported gap, the first gap, the second gap, and the target gap in this embodiment of this application. It can be learned from Table 2 that, for eDRX, the terminal device may report four values, the network device has 12 configurations, and there are a total of 4×12=48 cases. Each case may be uniquely determined by using the reported gap (a value reported by the terminal device), the first gap and the second gap (a value configured by the network device for eDRX, and also a value configured by the network device for the terminal device).

For the 12 configurations of the network device, 40 ms indicates that the network device sets one eDRX short gap to 40 ms for the terminal device, and no eDRX long gap is configured. The second gap in another similar form where there is only one value corresponding to the value configured by the network device for eDRX has a similar sense, 40 ms+1 s indicates that the network device sets one eDRX short gap to 40 ms and one eDRX long gap to 1 s for the terminal device. A configuration in another similar form where there are two different values corresponding to the value configured by the network device for eDRX has a similar sense.

Similarly, an example in which the detection position is a position that is before the start position of the first paging occasion PO in the paging time window PTW and that is away from the PO by a sum of the target gap and configured maximum duration of the wake-up signal is used.

It is assumed that a DRX gap configured by the network device in this case is 40 ms, and the maximum wake-up signal duration is 128 ms.

When the value reported by the terminal device is 40 ms, and the value configured by the network device for the eDRX is 240 ms, it indicates that the terminal device reports a WUS gap to be 40 ms, and the network device only sets the eDRX short gap to 240 ms, and does not configure an eDRX long gap. In this case, a WUS gap corresponding to the terminal device is 240 ms, in other words, the network

TABLE 1

Correspondence among the reported gap, the first gap, the second gap, and the target gap

| | | Value configured for eDRX by the network device | | | | | | | | | | |
|---|---|---|---|---|---|---|---|---|---|---|---|---|
| | | 40 ms | 80 ms | 160 ms | 240 ms | 40 ms + 1 s | 80 ms + 1 s | 160 ms + 1 s | 240 ms + 1 s | 40 ms + 2 s | 80 ms + 2 s | 160 ms + 2 s | 240 ms + 2 s |
| Value reported by the terminal device | 40 ms | 40 ms | 80 ms | 160 ms | 240 ms | 40 ms | 80 ms | 160 ms | 240 ms | 40 ms | 80 ms | 160 ms | 240 ms |
| | 240 ms | [DRX gap] | [DRX gap] | [DRX gap] | 240 ms | [DRX gap] | [DRX gap] | [DRX gap] | 240 ms | [DRX gap] | [DRX gap] | [DRX gap] | 240 ms |
| | 1 s | [DRX gap] | [DRX gap] | [DRX gap] | [DRX gap] | 1 s | 1 s | 1 s | 1 s | 2 s | 2 s | 2 s | 2 s |
| | 2 s | [DRX gap] | [DRX gap] | [DRX gap] | [DRX gap] | 40 ms | 80 ms | 160 ms | 240 ms | 2 s | 2 s | 2 s | 2 s | eDRX is 240 ms, it indicates that the terminal device reports a WUS gap to be 40 ms, and the network device only sets the eDRX short gap to 240 ms, and does not configure an eDRX long gap. In this case, a WUS gap corresponding to the terminal device is 240 ms, in other words, the network device sends a WUS of the terminal device at 240 ms+128 ms, and the terminal device detects the WUS at 240 ms+128 ms.

When the value reported by the terminal device is 40 ms, and the value configured by the network device for the eDRX is 240 ms+1 s, it indicates that the terminal device reports a WUS gap to be 40 ms, and the network device sets the eDRX short gap to 240 ms, and additionally sets the eDRX long gap to 1 s. In this case, a WUS gap corresponding to the terminal device is 240 ms, in other words, the network device sends a WUS of the terminal device at 240 ms+128 ms, and the terminal device detects the WUS at 240 ms+128 ms.

When the value reported by the terminal device is 1 s, and the value configured by the network device for the eDRX is 240 ms+1 s, it indicates that the terminal device reports a WUS gap to be is (indicating that the terminal device is likely to have a WUS-dedicated detection circuit), and the network device sets the eDRX short gap to 240 ms, and additionally sets the eDRX long gap to 1 s. In this case, a WUS gap corresponding to the terminal device is 1 s, in other words, the network device sends a WUS of the terminal device at 1 s+128 ms, and the terminal device detects the WUS at 1 s+128 ms.

When the value reported by the terminal device is 240 ms, and the value configured by the network device for the eDRX is 80 ms, it indicates that the terminal device reports a WUS gap to be 240 ms, and the network device sets the eDRX short gap to 80 ms, and does not configure an eDRX long gap. In this case, a DRX gap corresponding to the terminal device is 40 ms, in other words, the network device sends a WUS of the terminal device at DRX gap+128 ms=40 ms+128 ms, and the terminal device detects the WUS at DRX gap+128 ms=40 ms+128 ms.

When the value reported by the terminal device is 1 s, and the value configured by the network device for the eDRX is 80 ms, it indicates that the terminal device reports a WUS gap to be Is, and the network device sets the eDRX short gap to 80 ms, and does not configure an eDRX long gap. In this case, the eDRX short gap corresponding to the terminal device is 80 ms, in other words, the network device sends a WUS of the terminal device at eDRX short gap+128 ms=80 ms+128 ms, and the terminal device detects the WUS at eDRX short gap+128 ms=80 ms+128 ms.

Other cases in Table 2 are similar.

In addition, in the foregoing technical solution, when the reported gap is 1 s or 2 s and the network device does not configure an eDRX long gap, the target gap is the eDRX short gap. Compared with a case in which the target gap is the DRX gap (the terminal device needs to switch from the eDRX mode to the DRX mode to detect a WUS, power consumption of the terminal device increases. Specifically, if there is no paging on the PO (the network device does not send a WUS), the terminal device may always be in eDRX mode. In other words, behavior of the terminal device is as follows: being in eDRX mode→detecting a WUS→failing to detect a WUS→being still in eDRX mode. However, when the target gap is the DRX gap, the terminal device needs to switch from the eDRX mode to the DRX mode to detect a WUS. Duration in eDRX mode becomes shorter, and power consumption of the terminal device increases. The behavior of the terminal device changes to: being in eDRX mode→being in DRX mode→detecting a WUS→failing to detect a WUS→being in DRX mode), the terminal device may detect a wake-up signal in eDRX mode, and a time in which the terminal device is in eDRX mode can be prolonged as much as possible, thereby further reducing the power consumption of the terminal device.

This application provides a terminal device, to implement the method that is for detecting a wake-up signal and that is described in any one of the foregoing embodiments.

Figure 9:
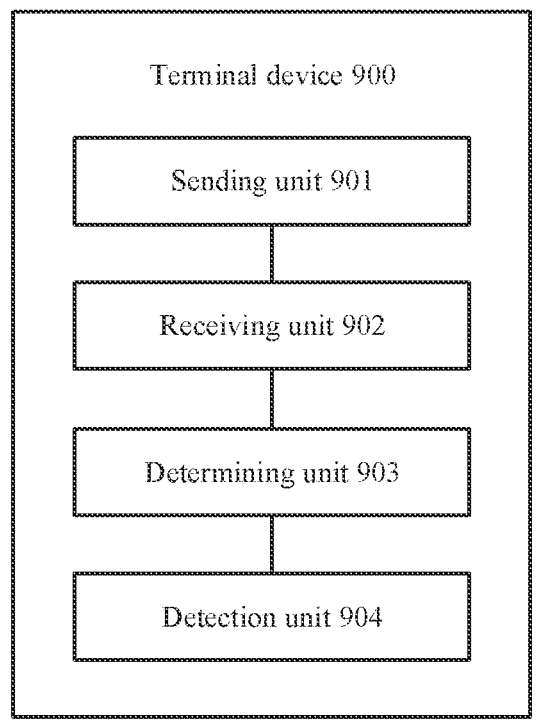
FIG. 9 is a schematic structural diagram of a terminal device according to an embodiment of this application.

FIG. 9 is a schematic structural diagram of a terminal device according to an embodiment of this application. As shown in FIG. 9, a terminal device 900 may include:

- a sending unit 901, configured to send first information to a network device, where the first information is used to indicate a reported gap;
- a receiving unit 902, configured to receive second information sent by the network device;
- a determining unit 903, configured to determine a configuration condition of a first gap and a configuration condition of a second gap based on the second information, where
- the determining unit 903 is further configured to: determine a target gap based on the reported gap, the configuration condition of the first gap, and the configuration condition of the second gap; and
- a detection unit 904, configured to detect a wake-up signal at a detection position before a start position of the first paging occasion in a paging time window PTW, where

TABLE 2

Another correspondence among the reported gap, the first gap, the second gap, and the target gap

| | | Value configured for eDRX by the network device | | | | | | | | | | | |
|---|---|---|---|---|---|---|---|---|---|---|---|---|---|
| | | 40 ms | 80 ms | 160 ms | 240 ms | 40 ms + 1 s | 80 ms + 1 s | 160 ms + 1 s | 240 ms + 1 s | 40 ms + 2 s | 80 ms + 2 s | 160 ms + 2 s | 240 ms + 2 s |
| Value reported by the terminal device | 40 ms | 40 ms | 80 ms | 160 ms | 240 ms | 40 ms | 80 ms | 160 ms | 240 ms | 40 ms | 80 ms | 160 ms | 240 ms |
| | 240 ms | [DRX gap] | [DRX gap] | [DRX gap] | 240 ms | [DRX gap] | [DRX gap] | [DRX gap] | 240 ms | [DRX gap] | [DRX gap] | [DRX gap] | 240 ms |
| | 1 s | 40 ms | 80 ms | 160 ms | 240 ms | 1 s | 1 s | 1 s | 1 s | 2 s | 2 s | 2 s | 2 s |
| | 2 s | 40 ms | 80 ms | 160 ms | 240 ms | 40 ms | 80 ms | 160 ms | 240 ms | 2 s | 2 s | 2 s | 2 s |

In the foregoing technical solution, the terminal device determines the target gap based on the reported gap, the first gap, and the second gap, and further determines the position for detecting the wake-up signal with reference to the maximum duration of the wake-up signal, so that the terminal device can be prevented from blindly detecting the wake-up signal, thereby reducing the power consumption of the terminal device.

the detection position is determined based on the target gap and maximum duration of the wake-up signal.

It may be understood that for specific implementations and beneficial effects of the units in the terminal device 900 in this embodiment of this application, refer to related descriptions in the method embodiments. Details are not described herein again.

Figure 10:
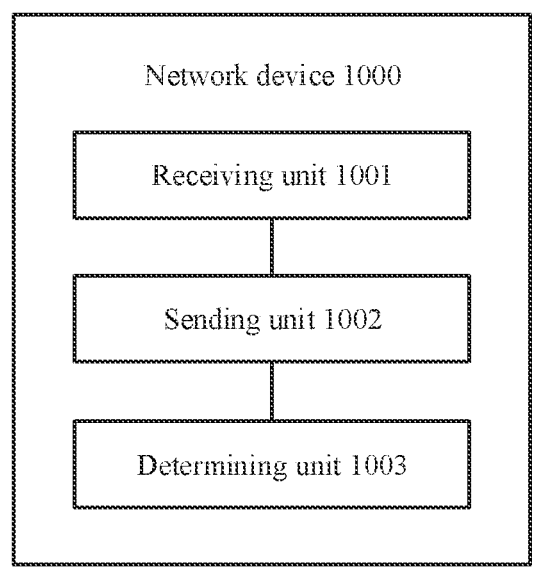
FIG. 10 is a schematic structural diagram of a network device according to an embodiment of this application.

FIG. 10 is a schematic structural diagram of a network device according to an embodiment of this application. As shown in FIG. 10, a network device 1000 may include:

a receiving unit 1001, configured to receive first information sent by a terminal device, where the first information is used to indicate a reported gap;

a sending unit 1002, configured to send second information to the terminal device, where the second information is used to indicate a configuration condition of a first gap and a configuration condition of a second gap;

a determining unit 1003, configured to: determine a target gap based on the reported gap, the configuration condition of the first gap, and the configuration condition of the second gap, where the sending unit 1002 is further configured to send a wake-up signal at a detection position before a start position of the first paging occasion in a paging time window PTW, where the detection position is determined based on the target gap and maximum duration of the wake-up signal.

It may be understood that for specific implementations and beneficial effects of the units in the network device 1000 in this embodiment of this application, refer to related descriptions in the method embodiments. Details are not described herein again.

Figure 11:
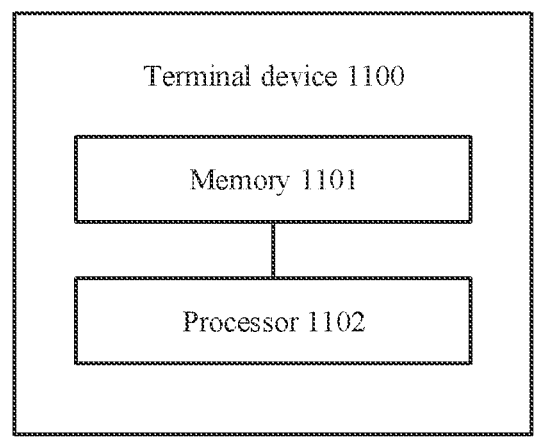
FIG. 11 is a schematic structural diagram of a terminal device according to another embodiment of this application.

FIG. 11 is a schematic structural diagram of a terminal device according to another embodiment of this application. A terminal device 1100 in FIG. 1I may implement the method that is for detecting a wake-up signal and that is described in any one of the foregoing embodiments. The terminal device 1100 in FIG. 11 may include a memory 1101 and a processor 1102. The memory 1101 may be used to store a program. The processor 1102 may be used to execute the program stored in the memory. When the program stored in the memory 1101 is executed, the processor 1102 may be configured to perform the method that is for detecting a wake-up signal and that is described in any one of the foregoing embodiments.

Figure 12:
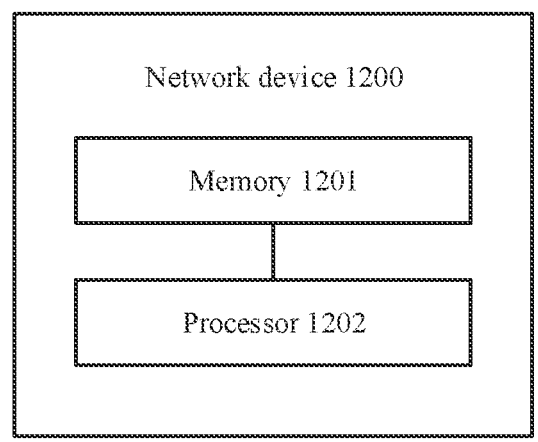
FIG. 12 is a schematic structural diagram of a network device according to another embodiment of this application.

FIG. 12 is a schematic structural diagram of a network device according to another embodiment of this application. A network device 1200 in FIG. 12 may implement the method that is for sending a wake-up signal and that is described in any one of the foregoing embodiments. The network device 1200 in FIG. 12 may include a memory 1201 and a processor 1202. The memory 1201 may be used to store a program. The processor 1202 may be used to execute the program stored in the memory. When the program stored in the memory 1201 is executed, the processor 1202 may be configured to perform the method that is for sending a wake-up signal and that is described in any one of the foregoing embodiments.

An embodiment of this application further provides a chip. The chip includes a transceiver unit and a processing unit. The transceiver unit may be an input/output circuit or a communication interface. The processing unit is a processor, a microprocessor, or an integrated circuit integrated on the chip. The chip may perform the method performed on a terminal device side in the foregoing embodiments.

An embodiment of this application further provides a chip. The chip includes a transceiver unit and a processing unit. The transceiver unit may be an input/output circuit or a communication interface. The processing unit is a processor, a microprocessor, or an integrated circuit integrated on the chip. The chip may perform the method performed on a network device side in the foregoing embodiments.

This application provides a computer-readable storage medium, where the computer-readable storage medium stores an instruction; and when the instruction is run on a computer, the computer is enabled to perform the method that is for detecting a wake-up signal and that is described in any one of the foregoing embodiments.

This application further provides a computer program product including an instruction. When the computer program product runs on a computer, the computer is enabled to perform the method that is for detecting a wake-up signal and that is described in any one of the foregoing embodiments.

This application provides a computer-readable storage medium, where the computer-readable storage medium stores an instruction; and when the instruction is run on a computer, the computer is enabled to perform the method that is for sending a wake-up signal and that is described in any one of the foregoing embodiments.

This application further provides a computer program product including an instruction. When the computer program product runs on a computer, the computer is enabled to perform the method that is for sending a wake-up signal and that is described in any one of the foregoing embodiments.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory. RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for detecting a wake-up signal, comprising:
sending first information to a network device, wherein the first information indicates a reported gap;
receiving second information from the network device, wherein the second information indicates a configuration condition of a first gap and a configuration condition of a second gap;
determining the configuration condition of the first gap and the configuration condition of the second gap based on the second information;
when the reported gap is 1 second (s) or 2 s, the first gap is set to 40 milliseconds (ms), 80 ms, 160 ms, or 240 ms, and the second gap is not configured, determining that a target gap is the first gap; and
detecting a wake-up signal at a detection position before a start position of the first paging opportunity in a paging time window, wherein the detection position is determined based on the target gap and maximum duration of the wake-up signal.

2. The method according to claim 1, wherein the first gap is an extended discontinuous reception (eDRX) short gap, wherein the second gap is an eDRX long gap, and wherein the eDRX long gap is greater than the eDRX short gap.

3. A method for sending a wake-up signal, comprising:
receiving first information from a terminal device, wherein the first information indicates a reported gap;
sending second information to the terminal device, wherein the second information indicates a configuration condition of a first gap and a configuration condition of a second gap;
when the reported gap is 1 second (s) or 2 s, the first gap is set to 40 milliseconds (ms), 80 ms, 160 ms, or 240 ms, and the second gap is not configured, determining that a target gap is the first gap; and
sending a wake-up signal at a detection position before a start position of the first paging opportunity in a paging time window, wherein the detection position is determined based on the target gap and maximum duration of the wake-up signal.

4. The method according to claim 3, wherein the first gap is an extended discontinuous reception (eDRX) short gap, wherein the second gap is an eDRX long gap, and wherein the eDRX long gap is greater than the eDRX short gap.

5. A terminal device, wherein the terminal device comprises a memory and at least one processor, wherein the memory stores a program, and wherein the program, when executed by the at least one processor, causes the terminal device to:
send first information to a network device, wherein the first information indicates a reported gap;
receive second information from the network device, wherein the second information indicates a configuration condition of a first gap and a configuration condition of a second gap;
determine the configuration condition of the first gap and the configuration condition of the second gap based on the second information;
when the reported gap is 1 second (s) or 2 s, the first gap is set to 40 milliseconds (ms), 80 ms, 160 ms, or 240 ms, and the second gap is not configured, determine that a target gap is the first gap; and
detect a wake-up signal at a detection position before a start position of the first paging opportunity (PO) in a paging time window, wherein the detection position is determined based on the target gap and maximum duration of the wake-up signal.

6. The terminal device according to claim 5, wherein the first gap is an extended discontinuous reception (eDRX) short gap, wherein the second gap is an eDRX long gap, and wherein the eDRX long gap is greater than the eDRX short gap.

7. A network device, wherein the network device comprises a memory and at least one processor, wherein the memory stores a program, and wherein the program, when executed by the at least one processor, causes the network device to:
receive first information from a terminal device, wherein the first information indicates a reported gap;
send second information to the terminal device, wherein the second information indicates a configuration condition of a first gap and a configuration condition of a second gap;
when the reported gap is 1 second (s) or 2 s, the first gap is set to 40 milliseconds (ms), 80 ms, 160 ms, or 240 ms, and the second gap is not configured, determine that a target gap is the first gap; and
send a wake-up signal at a detection position before a start position of the first paging opportunity in a paging time window (PTW), wherein the detection position is determined based on the target gap and maximum duration of the wake-up signal.

8. The network device according to claim 7, wherein the first gap is an extended discontinuous reception (eDRX) short gap, wherein the second gap is an eDRX long gap, and wherein the eDRX long gap is greater than the eDRX short gap.

* * * * *